United States Patent [19]

Hause

[11] 3,845,674
[45] Nov. 5, 1974

[54] TRANSMISSION CONTROLS FOR LOW TORQUE SHIFTING
[75] Inventor: Gilbert K. Hause, Bloomfield Hills, Mich.
[73] Assignee: General Motors Corporation, Detriot, Mich.
[22] Filed: Nov. 24, 1972
[21] Appl. No.: 309,140

[52] U.S. Cl. .................................. 74/878, 74/877
[51] Int. Cl. ........................................... F16h 57/06
[58] Field of Search ............... 74/878, 877; 192/.07

[56] References Cited
UNITED STATES PATENTS
1,611,042   12/1926   Johnston et al. ............... 74/878 X
2,226,205   12/1940   Linsley ............................ 74/877 X
3,418,872   12/1968   Vernati ............................. 74/878

Primary Examiner—Benjamin W. Wyche
Assistant Examiner—J. Reep
Attorney, Agent, or Firm—Charles R. White

[57] ABSTRACT

This transmission has a hydrodynamic fluid unit and change speed gearing which can be manually shifted only under minimum engine torque conditions to minimize wear on the clutches and brakes and to provide for simplified hydraulic controls. In one embodiment a spring loaded locking plunger prevents movement of the selector lever until the throttle pedal is released and engine vacuum effects relief of the spring load. In another embodiment a locking plunger controlled directly by the throttle pedal prevents movement of the selector lever until the throttle pedal is released so that only low torque shifts can be made.

3 Claims, 4 Drawing Figures

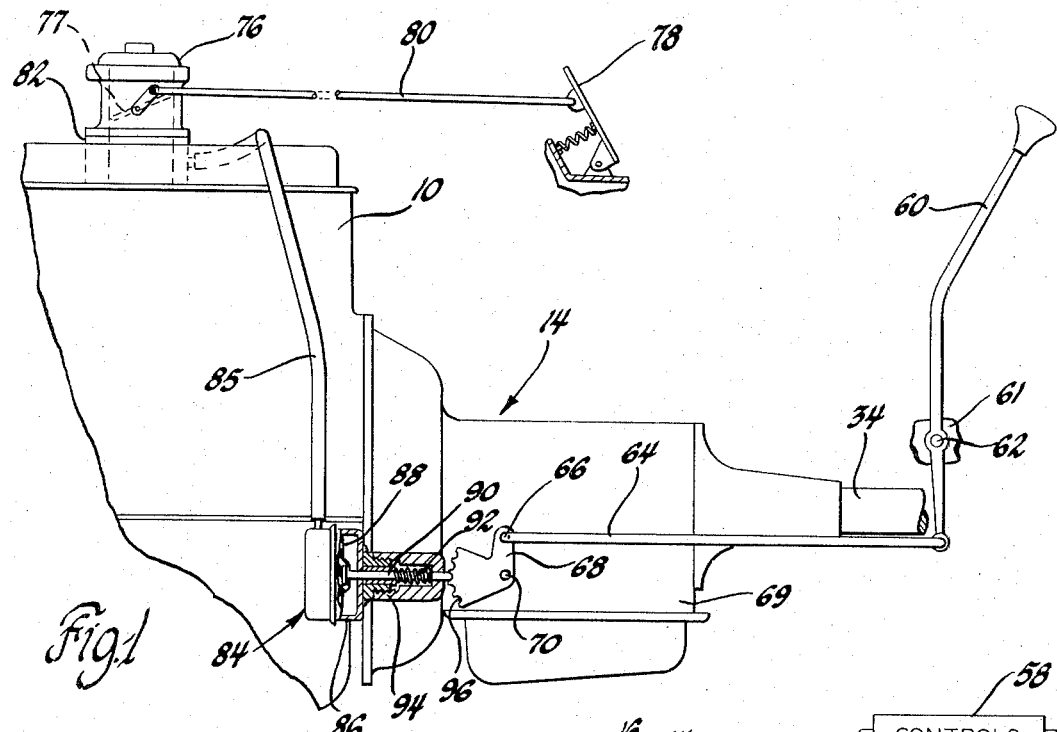

TRANSMISSION CONTROLS FOR LOW TORQUE SHIFTING

This invention relates to transmission controls and more particularly to new and improved manual controls for change speed transmissions which can be actuated to shift transmission speed ratios only under predetermined low engine torque conditions.

In many economy type vehicles such as the compact low power-to-weight passenger cars, there has been increased usage of torque converter and fluid coupling transmissions with change speed planetary gearing. These transmissions usually have complex hydraulic controls for automatically changing the speed ratios of the transmission in accordance with the operating conditions of the vehicle. While the employment of such transmissions in smaller vehicles has been satisfactory, their expense has materially increased the cost of the vehicle.

In this invention a change speed transmission having a converter or fluid coupling can be shifted only under minimum engine torque conditions to reduce wear on the drive clutches and brakes and to provide for a transmission proving economical and simplified hydraulic controls particularly suitable for economy type vehicles. In one embodiment a spring loaded locking plunger engages a selector lever detent plate to normally prevent movement of the transmission selector lever when the engine is producing drive torque. When the throttle is released, engine vacuum increases and atmospheric pressure acting on a diaphragm connected to the locking plunger reduces the spring load to a point where manual shifting can be accomplished. In another embodiment a locking plunger operated directly from the throttle pedal engages an opening in the transmission selector detent plate at each gear position normally preventing manual movement of the shift lever. At a closed throttle position, the plunger is moved out of locking engagement with the detent plate allowing movement of the selector lever.

The hydraulic controls of this invention being only manually operable eliminate control components such as the governor valve, the shift valves and the throttle valve used in automatic change speed transmissions to thereby provide a straightforward, simplified and economical transmission for use in economy type vehicles. With disc type clutches and brake bands there is smooth power transfer during the manual gear changes. With this invention, the main clutch synchronized gearing of prior manual transmissions are eliminated and replaced by an economical fluid unit transmission featuring hydraulically actuated clutch and brakes for smooth ratio changes.

These and other features, objects and advantages of this invention will become more apparent from the following detailed description and drawing in which:

FIG. 1 is a side elevational view of a vehicle power package illustrating a first embodiment of this invention;

FIG. 2 is a diagrammatical view of a change speed transmission;

FIG. 3 is a side elevational view of a vehicle power package illustrating another embodiment of this invention;

FIG. 4 is a view taken generally along lines 4—4 of FIG. 3.

In FIG. 1 there is shown an internal combustion engine 10 which has an output that is drivingly connected to the input 12 of a change speed transmission 14 shown diagrammatically in FIG. 2. This transmission has a hydrodynamic fluid coupling 16 with a bladed pump P driven by input 12 and a bladed turbine T. The turbine T is connected by a turbine shaft 18 to the input of separate first and second multiplate clutches 20 and 22. The clutch 22 is engaged in first, third and reverse drive and is drivingly connected to a sun gear 24 of a first planetary gearset. Clutch 22 is engaged for second, third and fourth drive and is drivingly connected to a carrier 28 supporting planet gears 30 that mesh with the sun gear 24 and with a ring gear 32 of the first planetary gearset. Ring gear 32 is drivingly connected to the transmission output 34 and to a carrier 36 of a second planetary gearset disposed adjacent to the first planetary gearset. This carrier rotatably supports planet gears 38 that mesh with a sun gear 42 and with a ring gear 44. The ring gear 44 is drivingly connected by drum 45 to the carrier 28 of the first planetary gearset. The sun gear 42 of the second planetary gearset is drivingly connected to a drum 46 which is selectively engageable by an annular friction band 50 to condition the planetary gearing for first and second forward drive ratios. A reverse drive friction band 52 is selectively engageable with a drum 45 to condition the planetary gearset for reverse. A fourth range friction band 53 is selectively engageable with drum 54 that is connected to the sun gear 24 to condition the gearing for a fourth range forward drive.

The bands and clutches are selectively applied by hydraulically operated servos such as piston 55 for clutch 20 and piston 56 for clutch 22 in response to the position of a selector valve in hydraulic controls 58 by the appropriate movement of shift lever 60. The shift lever 60 is mounted for limited pivotal movement on a support 61 in a vehicle by pivot 62. The lower end of the lever 60 is pivotally connected to a longitudinally extending link 64 that extends alongside of the transmission and terminates in a pivotal connection 66 with a detent plate 68. This detent plate is mounted for limited rotation on the transmission case 69 by a manual shaft 70. Manual shaft 70 extends into the interior of the transmission case and is drivingly connected to a conventional manual valve in controls 58 that controls the feed and exhaust of oil pressure to the various servos actuating the different clutches and brakes described above. Thus by turning the shift lever 60 on pivot 62 to different predetermined positions, the detent plate 68 is turned and a selector valve is moved to different predetermined positions to effect the selective engagement and disengagement of the various clutches and bands so that the transmission is manually shifted between the forward drive ratios, neutral and reverse.

For a highly economical and simplified transmission with optimum clutch and brake service life, this invention has provisioned for the reduction of engine torque to a minimum operating torque before shifting between the drive ratios. As shown, the engine 10 has a conventional carburetor 76 with a throttle valve 77 that controls the fuel air mixture fed to the cylinders of the engine. The throttle valve opening is controlled by the vehicle operator through a conventional throttle pedal 78 and linkage 80. The intake manifold 82 of the carburetor is pneumatically connected to a vacuum control assembly 84 by a hose 85. The vacuum control assembly 84 comprises a metal housing 86 that is secured to the engine 10. Disposed in the housing 86 is an air-tight diaphragm 88 connected to a plunger 90. This plunger is biased by spring 92 disposed in an extension 94 of housing 86 into engagement with any of the spaced notches 96 formed in the periphery of the detent plate 68 to hold the detent plate stationary. The air-tight side of diaphragm 88 is connected by the hose 85 to an opening in the intake manifold that is on the vacuum side of the throttle valve. When the throttle pedal and throttle valve are moved to the idle position vacuum is high so that atmospheric pressure acts on the other side of the diaphragm to relieve the load of spring 92 to an extent that the selector lever can turn the index plate 68, depressing the spring biased plunger 90 so that the transmission can be shifted. When the vacuum is progressively reduced from part throttle up to wide open throttle, pneumatic pressures on the diaphragm become substantially equalized and the load of spring 92 again causes the locking engagement of plunger 90 with plate 68 to prevent movement of shift lever 60. Thus, when the throttle pedal is depressed to open the throttle valve, the load of spring 92 is such that the selector lever cannot be turned to shift the transmission while at closed throttle position the spring load is light so that index plate can be turned and the ratio changes can be made.

A second embodiment of the invention similar to the first embodiment is shown in FIG. 3 with corresponding components having the same reference numerals which have been primed. There is selector lever detent plate 68' having a series of openings 96' each of which can be aligned with a shift blocking plunger 90' that is connected to and operated by a cable 100 extending to a throttle pedal 102. The cable is slidably mounted in a flexible tube 104 which is anchored by brackets 106 and 108. The throttle pedal is operatively connected by the bellcrank 111 and linkage 112 to the throttle valve 77' within carburetor 76'.

The throttle pedal is depressed to actuate the linkage and open throttle valve 77' and to move the plunger 90' into an aligned opening 96' so that no further ratio changes can be made from part throttle up to full throttle. However, when the throttle pedal 102 is released to close the throttle valve, the throttle pedal spring, not shown, turns the throttle pedal counterclockwise to retract the plunger from the opening 96' in the detent plate. With closed throttle, engine torque is at a minimum and the transmission can be shifted by appropriate movement of the transmission selector lever 60' to turn the detent plate 68' and the connected manual shaft 70'.

While preferred embodiments of the invention have been shown and described in detail to illustrate the invention various changes and modifications may be made thereto without departing from the scope of the invention set forth in the following claims:

I claim:

1. In combination an internal combustion engine, a carburetor, said carburetor having throttle valve means movable between closed and wide open valve positions to control the output torque of said engine by controlling the fuel air mixture fed to said engine, a variable vacuum source provided by said engine controlled by said throttle valve means, control means for said throttle valve means movable between first and second positions corresponding respectively to the closed and wide open positions of said throttle valve means, a change speed transmission, torque transmitting fluid unit means operatively connecting said engine to said transmission for continuously transmitting engine torque to said engine for all positions of said throttle valve means, manually operated shift lever means operatively connected to said transmission, pivot means mounting said lever means for turning movement to different predetermined positions to change the speed ratios of said transmission, a transmission selector detent plate, means operatively connecting said detent plate to said shift lever means, shiftable locking plunger means supported adjacent to said detent plate for engaging said detent plate, spring means for urging said locking plunger means into locking engagement with said detent plate to prevent movement of said detent plate and said shift lever means, and pneumatic diaphragm means directly and continuously operatively connected to said vacuum source and directly connected to said locking plunger means for shifting said locking plunger means from locking engagement with said detent plate in response to movement of said throttle valve control means to said first position corresponding to the closed position of said throttle valve to permit said shift lever means to be subsequently moved to one of said predetermined positions to change the speed ratio of said transmission.

2. In combination an internal combustion engine, said engine having a carburetor and a throttle valve for controlling the output torque of said engine by controlling air-fuel mixture fed to the engine, a vacuum source variable between high and low vacuum provided by said engine, operator means for moving said throttle valve to a plurality of throttle positions ranging from a closed throttle position to a wide open throttle position, a change speed transmission, fluid unit means operatively connecting said engine to said transmission for continuously transmitting engine torque to said transmission, shift lever means for said transmission, pivot means supporting said shift lever means for turning movement to different predetermined positions to change the speed ratios of said transmission, a detent plate having a plurality of spaced recesses operatively connected to said shift lever means and operatively connected to said transmission, plunger means for engaging said spaced recesses of said detent plate to prevent movement of said detent plate and said shift lever means, spring means operatively connected to said plunger means for urging said plunger means into engagement with said recesses, a vacuum operated control assembly operatively connected to said plunger means and directly to said source of vacuum, said vacuum operated control assembly having flexible diaphragm means therein, said diaphragm means having first and second sides, means connecting said first side directly to said plunger means, said first side being continuously pneumatically connected to atmospheric pressure, air passage means directly and continuously pneumatically connecting said second side of said diaphragm means to said vacuum source so that said diaphragm means urges said plunger means from locking engagement with said detent plate when said operator means has positioned said throttle valve means at a closed throttle position and said vacuum source has been varied to a predetermined high vacuum.

3. In combination an internal combustion engine having a carburetor, an air intake manifold and a throttle valve for controlling the output torque of said engine by controlling the air-fuel mixture supplied to the engine, operator means for moving said throttle valve to a plurality of throttle positions ranging from a closed throttle position and a wide open throttle position, a change speed transmission, hydrodynamic fluid unit means drivingly connecting said engine to said transmission, shift lever means movable to different predetermined positions to change the speed ratios of said transmission, a pivotally mounted detent plate operatively connected to said shift lever means, plunger means engaging said detent plate to prevent movement of detent plate and said shift lever means, spring means for urging said plunger means into direct engagement with said detent plate, a vacuum control assembly operatively connected to said locking means and to said air intake manifold, said vacuum control assembly having flexible diaphragm means therein providing first and second sides, said first side of said diaphragm means being continuously connected to atmospheric pressure, means connecting said plunger means directly to said flexible diaphragm means, air passage means continuously connecting said second side of said diaphragm means of said vacuum control assembly to said air intake manifold, means mounting said diaphragm means in said control assembly so that said diaphragm means moves said locking means from locking engagement with said detent plate when said operator means has moved said throttle valve to a closed throttle position to establish a high vacuum on said second side thereof thereby allowing atmospheric pressure to move said diaphragm means and said plunger means from locking engagement with said detent plate and said spring means being operatively disposed around said plunger means for moving said plunger means into locking engagement with said detent plate when said operator means has moved said throttle valve to an open throttle position to reduce the vacuum effective on said diaphragm.

* * * * *